United States Patent [19]
Capes

[11] 3,906,140
[45] Sept. 16, 1975

[54] CO-PELLETIZING SALT MIXTURES
[75] Inventor: Charles E. Capes, Ottawa, Canada
[73] Assignee: Canadian Patents & Development Ltd., Ottawa, Canada
[22] Filed: July 17, 1972
[21] Appl. No.: 272,573

[30] Foreign Application Priority Data
Aug. 23, 1971 Canada .............................. 121156

[52] U.S. Cl. .................. 428/403; 252/70; 264/117; 264/122; 427/215
[51] Int. Cl.² .......................................... C09K 3/18
[58] Field of Search ......... 117/100 B; 264/113, 117, 264/122; 252/70; 23/313; 427/415; 428/403

[56] References Cited
UNITED STATES PATENTS

| | | | |
|---|---|---|---|
| 2,971,832 | 2/1961 | Stewart et al. | 23/313 X |
| 2,988,509 | 6/1961 | Schilberg | 252/70 |
| 3,140,326 | 7/1964 | Erck et al. | 264/117 |
| 3,345,443 | 10/1967 | Ziegler et al. | 264/117 |
| 3,353,949 | 11/1967 | Nau | 71/25 X |
| 3,665,066 | 5/1972 | Capes et al. | 264/117 |
| 3,666,523 | 5/1972 | Nau | 117/100 B |
| 3,681,246 | 8/1972 | Lewer et al. | 23/313 X |

FOREIGN PATENTS OR APPLICATIONS
797,148   10/1968   Canada

*Primary Examiner*—William D. Martin
*Assistant Examiner*—Stuart D. Frenkel
*Attorney, Agent, or Firm*—Alan A. Thomson

[57] ABSTRACT

Salts such as calcium and sodium chlorides are co-pelletized into composite pellets by contacting larger nuclei with finer particles in the presence of a salt solution which is substantially saturated in the salt of finer particle size and at least partially saturated in the other salt (or salts). This liquid acts as a viscous binder and binds the salts together into pellets in which the finer particles tend to be layered around the coarser nuclei. If desired, migration of part of the coarse nuclei salt toward the surface can be achieved. The pellets are easily handled without dusting and are useful e.g. for ice melting and dust control on roads.

11 Claims, 2 Drawing Figures

CO-PELLETIZING SALT MIXTURES

FIELD OF THE INVENTION

This invention is concerned with pelletizing two (or more) salts into composite, dense strong pellets which are easily stored, handled and shipped with a minimum of dusting or caking. These composite salt pellets find use in de-icing of winter roads, in road compaction and dust control, in minimizing winter freezing of piles of sand or aggregate, and in other applications such as regeneration of certain water-softening systems.

BACKGROUND AND PRIOR ART

Effluent streams from some chemical plants, e.g. the ammonia-soda (Solvay) process, contain waste or surplus salts which it would be desirable to process to avoid pollution problems. The salt as recovered from such effluent streams is often in a form very difficult to handle due to "rock" formation or caking or dusting or deliquescence depending on the circumstances and the salt. Thus there is a need to develop a means of utilizing waste or excess by-product salt and salt-containing effluent streams to produce a product which avoids the problems just mentioned, and which preferably has advantages in existing markets.

One relatively large volume market for calcium and sodium chlorides is the use on roads for de-icing, compaction or dust control. Calcium chloride is marketed in powder or flake form for this purpose. Rock salt or crude NaCl is also sold for these applications and mixtures of discrete particles of the two salts have been used for de-icing. The mixture of sodium and calcium chlorides enables ice to be melted at lower ambient temperatures than for sodium chloride alone. The mixtures have the advantages for ice melting over calcium chloride alone of being less costly and less deliquescent. However these simple mixtures are very subject to the handling and storage problems mentioned above, as well as to settling and segregation giving a non-uniform product.

Crude $CaCl_2$ itself commands a market in its own right e.g. for new road construction (compaction) and is often regarded as too costly and too difficult to handle and store for ice melting purposes. It would be desirable to have a salt product with some of the low temperature ice melting capability of $CaCl_2$ but a minimum of the cost, storage and handling problems associated with its use for this purpose.

In the ammonia-soda (or Solvay) process the overall reaction is $2NaCl+CaCO_3 \rightarrow Na_2CO_3+CaCl_2$. The excess salt (NaCl) used to favor the reaction (about 25–35%) appears in the calcium chloride liquor. This liquor is concentrated and $CaCl_2$ recovered but only to the extent it can be readily sold, much of the liquor being wasted. The NaCl is quite insoluble in strong $CaCl_2$ solutions and it appears in extremely fine crystalline form presenting a disposal problem. The recovered NaCl purity depends on the preceding purification steps carried out. Impure mixtures are usually discarded. New forms of salt products particularly mixtures with advantageous properties, could lead to much wider markets and enhance the economics of the whole Solvay-type processes.

Pellets of a single salt have been formed previously by a form of agglomeration (see U.S. Pat. No. 3,493,642 Feb. 3, 1970 Capes et al. and Canadian Pat. No. 797,148 Oct. 22, 1968 Capes et al.). Salts have been pressure compacted into uniform pellets or flakes in the past, but the process and product have disadvantages. Rock salt has been coated with an iron cyanide and about 0.5 to 4% $CaCl_2$ (U.S. Pat. No. 3,505,234 Apr. 7, 1970 Pinckernelle et al.). Sodium chloride, calcium chloride and water have been mixed into a paste and extruded to give porous particles (see U.S. Pat. No. 2,988,509 June 13, 1961 Schilberg). The layered composite pellets and their production according to the present invention are believed to be an advance in the art. Advantages of the layered pellets will be discussed more fully below.

SUMMARY OF INVENTION AND DESCRIPTION OF DRAWINGS

The present invention includes pelletizing salt mixtures containing large nuclei and fines using as binder liquids salt solutions or effluent salt streams or composite brines. On drying the dissolved salts become solid bridges between initial particles. It is preferred to utilize solid salt by-products and liquid process streams or effluents arising in the Solvay process cycle or other existing plant operations.

Figure 1:
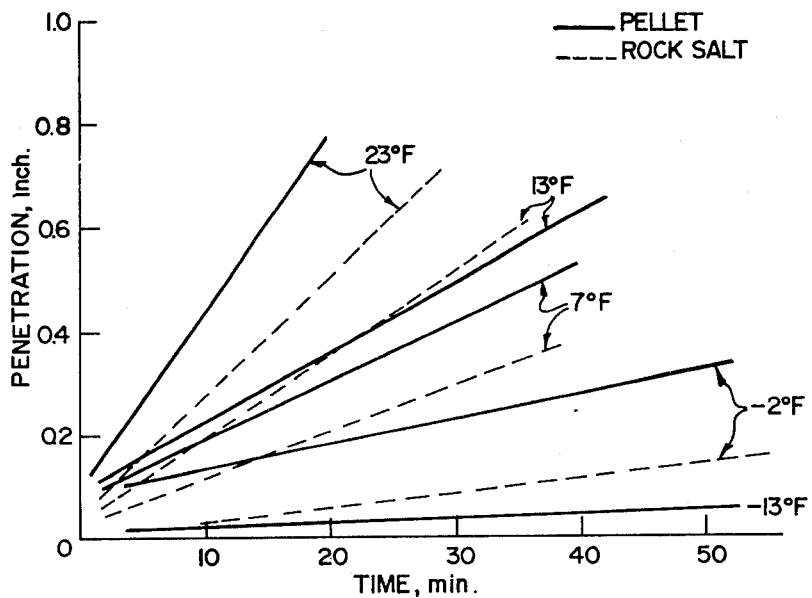
FIG. 1 illustrates penetration rates into ice for composite pellets according to the invention, and for rock salt, at various temperatures.

The method comprises
a. providing nuclei for the pellets by one of
   i. the use of coarse particles of one or more salts, and ii. an initial agglomeration of fine salt particles;
b. contacting the nuclei with fine particles of one or more salts in the presence of a dispersed binder liquid which is a solution of at least one of said salts and initially substantially saturated at least with respect to the salt or salts of finer particle size;
c. during said contacting subjecting the mixture to a pellet-forming operation causing layering of said fine particles about said nuclei and complete saturation of the binder liquid solution of initially incomplete;
d. recovering pellets from the mixture; and
e. removing liquid from the pellets.

DETAILED DESCRIPTION AND PREFERRED EMBODIMENTS

For de-icing, one preferred product is a co-pelletized mixture of coarse $CaCl_2$ particles e.g. in flake or chip form acting as nuclei, with NaCl fines layered around these nuclei. A preferred binder liquid is the underflow from a salt settler following the evaporators in the calcium chloride recovery circuit of a Solvay-type process plant. This liquid is a viscous solution saturated with NaCl and containing about 40% by weight of $CaCl_2$ (about 90–95% saturated in $CaCl_2$). Such a binder liquid is desirable from the standpoint of being saturated in the component of finer particle size so that any leaching or dissolution is mainly serving to decrease the coarser particle or nuclei size (and decrease the difference in particle size). The viscosity is also very appropriate for pelletizing these mixtures. Other advantages will be apparent from the Examples.

A satisfactory mixed pellet can also be made by agglomerating the fine NaCl precipitate with same composite binder solution (no $CaCl_2$ nuclei) in stages to form nuclei and layers thereon. A reasonably strong pelletized product which does not cake or dust and is readily handled results.

A composite non-uniform cross-section pellet of a major amount of NaCl and a minor amount of $CaCl_2$ is a preferred product. Usually at least about 5% $CaCl_2$ is needed for effective de-icing with about 20–30% preferred.

The composite binder liquid should contain a mixture of dissolved salts preferably corresponding to the mixture being pelletized. Non-uniform leaching of feed particles and desired deposition of bridges can be controlled by adjusting the composite salt binder solution. Completely saturated binder liquids can be used to avoid any leaching during pelletizing. This gives the most simply-controlled operation. The viscosity of the binder is important for good pelletizing with high viscosities usually being advantageous in commercial-scale pelletizing operations. Some adjustment of the viscosity can be made by control of solute concentrations and temperatures. It is preferred that the liquid be saturated with respect to the finer particle size salt and at least 35–40% saturated with respect to the coarser size component. The binder liquid will usually contain approximately 20–45% wt. of dissolved salt.

The amount of binder liquid used relative to the solids, is not critical and optimum amounts will depend on the particular system, concentration, temperature, viscosity, particle size, pellet size desired etc. Normally from about 8 to about 40% by wt. of binder liquid based on wt. of total solids will be suitable, the lower part of the range being used with large particles and nuclei and thin outer layers of fines.

Wet pelletizing is one mode of forming the pellets which has been found advantageous. This technique involves carrying out the agglomeration and pellet formation in or under a second immiscible liquid e.g. an inert organic solvent such as a hydrocarbon. Advantages include less sticking, less snowballing (easier size control), better mixng and less dust problem. See Canadian Pat. No. 797,148 Oct. 22, 1968 C.E. Capes et al.

While calcium chloride-sodium chloride mixture are of primary concern, other salt mixtures can also be pelletized according to the invention. Examples include NaCl + KCl and $CaCl_2 + Na_2SO_4$ mixtures. Mixtures of salts useful as fertilizers can also be pelletized according to the invention.

The process will be described in detail with reference to the preferred de-icing product prepared during by-product salts and streams from the $CaCl_2$ circuit of a Solvay-type process plant. The $CaCl_2$ was available in the form of impure coarse flake of about 1–4 mm. diameter. The NaCl fines were about 0.1–0.3 mm size and at least 95% NaCl. A salt settler underflow liquor of density 1.4 g/cm³, 42% wt $CaCl_2$ and 0.8% wt NaCl is a typical preferred binder (supernatant liquid used).

Rotating disc, pan or drum pelletizers may be used, with the nuclei (usually $CaCl_2$) added first, followed by the fines (NaCl) and a spray of binder liquid. About 10–35 wt. % of binder liquid was found suitable (based on dried pellet) but these limits may be varied for other systems. Pellets of the order of one-eight inch to one-fourth inch diameter can be formed continuously with this system.

The preferred pellets for road de-icing use, will be of non-uniform cross-section, having a nucleus of $CaCl_2$ or rock salt (NaCl) with surrounding layers containing both NaCl and $CaCl_2$. In the Examples, some of the nucleus salt has dissolved and migrated to the surface on drying leaving internal void space (about 30–40% by vol.). For best results at low ambient temperatures the surface layer will be of greater $CaCl_2$ content than layers more removed from the surface.

The following Examples illustrate the process and pelletized product in more detail without limiting the invention thereto.

EXAMPLE 1

A series of 14 experiments were carried out using the following materials:

NaCl Fines (97–99% NaCl) size analysis:

| Mesh | Mm. | Wt% |
|---|---|---|
| +50 | 0.30 | 16.5% |
| +70 | 0.21 | 60.2% |
| +100 | 0.15 | 93.3% |
| +140 | 0.11 | 100% |

Coarse $CaCl_2$ (Commercial Flake 78% $CaCl_2$) size analysis:

| | Wt % |
|---|---|
| +4.0 mm | 6.8% |
| +2.8 mm | 34.0% |
| +2.4 mm | 48.7% |
| +2.0 mm | 65.8% |
| +1.4 mm | 80.5% |
| −1.4 mm | 19.2% |

$CaCl_2$ Fines — Approximately 0.05–0.10 mm diam.

Binder Liquids

| | Source* | Composition (Wt. %) | | Density g/cm³ |
|---|---|---|---|---|
| | | NaCl | $CaCl_2$ | |
| A | Salt centrifuge discharge | 24.2 | 3.1 | 1.20 |
| B | Salt settler underflow | 0.8 | 42.3 | 1.37–1.38 |
| C | purified brine | 26.7 | 0 | 1.20 |

*Supernatants of specified $CaCl_2$ circuit streams in Solvay process.

Pellet formation was accomplished in a 10-inch-diam. balling pan with 3 inch deep sides mounted to rotate 45° to horizontal. The inside surface was lined with fine screen to provide friction to establish the correct tumbling action in the load. Four of the experiments were carried out "wet" i.e. under a blanket of hydrocarbon liquid such as Varsol (trademark for aliphatic hydrocarbon solvent). In the "dry" tests, the inside surfaces were continuously scraped with a blade simulating the scraping action of the plows in a commercial disc pelletizer. The pan revolved at 40–60 rpm for the "dry" tests, and at 60–80 rpm for the "wet" tests.

The experiments were carried out batchwise with about 100–200 g powder, and the binder liquid was introduced as a spray from above the pan. Nuclei were formed or introduced as a first step i.e., a small proportion of the solids were first formed into nuclei (or coarse $CaCl_2$ used directly as nuclei) and the balance of the powder was layered onto these nuclei) to form the final pellets. Easily handled pellets of one-eighth to one-fourth inch diameter were formed in each case.

The results are summarized in Table 1.

TABLE 1

| Test Number | Material Pelletized | Binder Liquid | Approx. Wt. % Liquid Used | Wt. % Water Wet Pellets | Comments on Pellets (Dry) |
|---|---|---|---|---|---|
| 1* | NaCl fines | A | 23–31 | 15–20% | Low strength, dusting |
| 2 | NaCl fines | A | 23–31 | 15–20% | " |

TABLE 1—Continued

| Test Number | Material Pelletized | Binder Liquid | Approx. Wt. % Liquid Used | Wt. % Water Wet Pellets | Comments on Pellets (Dry) |
|---|---|---|---|---|---|
| 3* | 1 part coarse $CaCl_2$ / 4 parts NaCl fines | B | 15 | about 10% | strong, non-dusting |
| 4 | 1 part coarse $CaCl_2$ / 4 parts NaCl fines | B | 15 | about 10% | " |
| 5* [3] | NaCl fines | B | 23–31 | 15–20% | acceptable strength, non-dusting |
| 6* | NaCl fines ball-milled overnight | A | 23–31 | 15–20% | strong pellets |
| 7 | 1 part coarse $CaCl_2$ / 4 parts NaCl fines | B, mixed in equal proportions with water | 15 | about 10% | medium strength, acceptable |
| 8 | 1 part coarse $CaCl_2$ / 4 parts NaCl fines | C | 15 | about 10% | low strength, some dusting |
| 9 [1] | 1 part coarse $CaCl_2$ / 4 parts NaCl fines | B | 15 | about 10% | strong, non-dusting |
| 10 [2a] | 1 part coarse $CaCl_2$ / 4 parts NaCl fines | B | 15 | about 10% | " |
| 11 [2b] | 1 part coarse $CaCl_2$ / 4 parts NaCl fines | B | 15 | about 10% | " |
| 12 | 1 part $CaCl_2$ fines / 3 parts NaCl fines | B | 23–31 | 15–20% | no pellets, solid cake on heating |
| 13 | 1 part $CaCl_2$ fines / 4 parts coarse $CaCl_2$ / 15 parts NaCl fines | B | 15 | about 10% | strong, non-dusting |
| 14 | 1 part $CaCl_2$ fines / 1 part coarse $CaCl_2$ / 6 parts NaCl fines | B | 22–28 | about 14–18% | strong pellets if ambient but not high temperature "drying" |

*processed "wet"
[1] about 0.05% iron oxide powder blended in to colour.
[2a] 1% sodium nitrite
[2b] 1% sodium hexametaphosphate } added as fine powder dispersed in binder liquid for anti-corrosion.
[3] some difficulty in nucleating the mixture on pan; would be difficult to carry out on large-scale, continuous operation.

Preferred formulations were tests 3, 4, and 9–11 and 13 in Table 1 where coarse $CaCl_2$ acted as nuclei. It was found the pellet formation was more easily stabilized in these tests tending to make continuous production attainable. Experience with finer NaCl powder i.e. top size 50 mesh and at least 25% wt. minus 200 mesh, indicates a stable pelleting operation is more easily attainable than for coarser powder. With such coarser powder a layering process on $CaCl_2$ nuclei is preferred.

The strength of the pellets was found to increase as the $CaCl_2$ content of the binder liquid increased. Thus liquid B with about 40% $CaCl_2$ content yielded very good pellets in tests 3, 4, 5, 9, 10 and 11. When binder liquid B was diluted 100% with water in test 7, the product was weaker, but acceptable. However liquid A in tests 1 and 2 and liquid C in test 8 gave pellets which were weak enough to lead to considerable dusting. These results indicate that a preferred binder liquid contains about 20–45% wt. $CaCl_2$.

Tests 9, 10 and 11 illustrate the use of pigment to produce a coloured pellet (advantageous for marking or de-icing evaluation), and the incorporation of corrosion inhibitor-type compounds. Tests 12, 13 and 14 illustrate the use of fine $CaCl_2$ available for instance from $CaCl_2$ flaking operation.

The binder liquids A–C used in these tests were saturated with respect to NaCl but not $CaCl_2$. Some of the pellets, after drying, were found to have small cavities in their centres where part of the coarse $CaCl_2$ used as nuclei had dissolved before or during drying (and been deposited nearer to the surface). This is primarily due to the large increase in $CaCl_2$ solubility as the temperature is raised. When the coarse $CaCl_2$ was replaced by fine $CaCl_2$ in test 12, the faster dissolution rate of the fines meant that the pellets liquified on drying. Thus test 12 was a failure in the sense that drying at elevated temperature caused the balls to flow and cake. This problem was solved by replacing only 20% of the coarse $CaCl_2$ by these fines as in Test 13, giving pellets that dried satisfactorily.

Very interesting pellets were obtained in test 14 in which 50% of the $CaCl_2$ was in the form of fines. These pellets could not be dried at 100°C without becoming liquified, but if "dried" slowly at room temperature, very hard pellets resulted, presumably due to the formation of $CaCl_2$ hydrates. Hence this type of formulation results in a strong pelletized product without expending heat energy in drying. This low temperature drying and hydration would also be applicable for Test 12.

EXAMPLE 2

Composite $CaCl_2$ + NaCl pellets were prepared as in Example 1 from 25 wt. % coarse $CaCl_2$ and 75 wt. % fine NaCl, the binder liquid being saturated in NaCl and unsaturated with but containing about 42% wt. $CaCl_2$. The amount of binder liquid used was about 15% wt. of the undried pellet. The pellets were about one-fifth of an inch in diameter and contained internal voids, giving a bulk density of 0.77 gm/cc or 48 lb/ft$^3$ (rock salt (NaCl) of equivalent size has a bulk density of about 1.17 gm/cc or 73 lb/ft$^3$). Pellet density averaged about 1.45 gm/cc compared to 2.16 for rock salt. Average pellet void space was about 36% by volume. It was evident that some $CaCl_2$ had migrated to the pellet surface on drying.

From phase diagrams, and solubility and freezing curves, solid NaCl, 25% $CaCl_2$ — 75% NaCl, and $CaCl_2$ may be in contact with solution phase at temperatures not lower than −6°F, −6.5°F and −57°F respectively. Thus it appears that major amounts of $CaCl_2$ blended with NaCl are required to significantly lower the minimum melting temperature.

An evaluation of these $CaCl_2$—NaCl pellets compared to rock salt in melting ice was carried out. The penetration (or melting) into ice was measured as follows. Ten cylindrical ice cubes were lined up "side by side" in a freezer set at the required temperature. Mirrors reflecting a scale behind each cube allowed the penetration to be followed visually. Single composite pellets, or pieces of rock salt (0.2 inch diam.) were placed on the upper ice surface and the penetration measured as a function of time. The quoted air temperature was constant around the cubes to within ± 1°F. The average penetration for 10 cubes was determined and plotted in FIG. 1 for both the composite pellets and rock salt.

Figure 2:
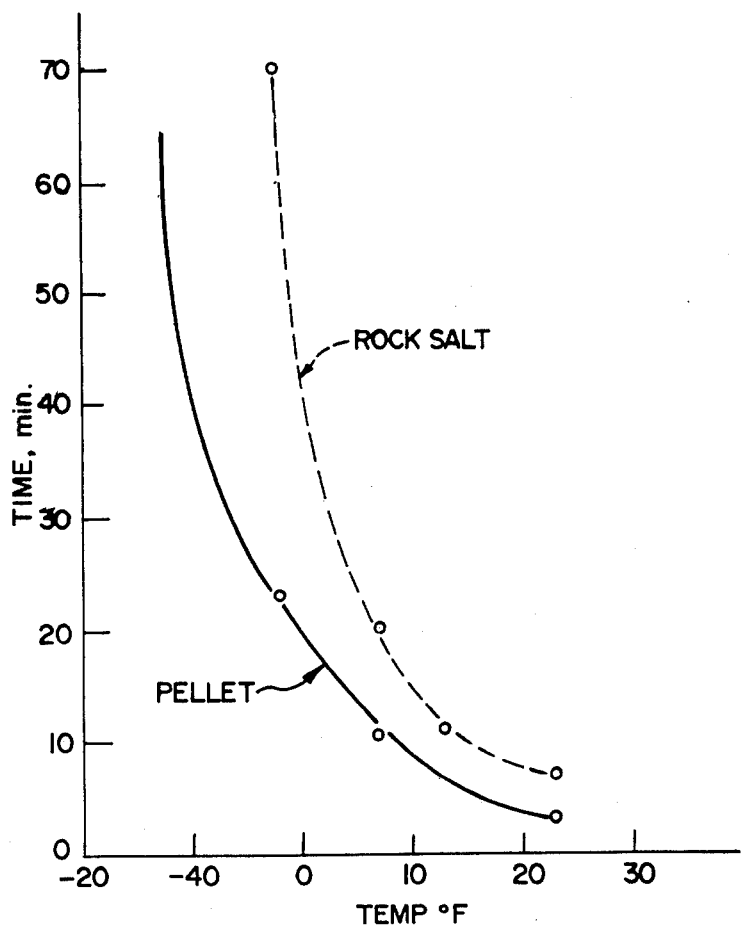
FIG. 2 depicts the time required to penetrate one pellet diameter into ice, for the composite pellet and for rock salt.

FIG. 2 is derived from FIG. 1 and shows the time required to penetrate a constant depth of 0.2 inch. In melting roadway ice, this is a reasonable choice for depth since the pellet or piece is then well-embedded in the surface and no longer vulnerable to being removed by traffic in a highway situation.

It is evident from these two Figures that the penetration rate for the composite pellet was greater than for rock salt, and the pellet was capable of melting ice at lower temperatures than the rock salt. The difference observed particularly in FIG. 2 is more than would be expected from the minor difference in minimum melting temperature (0.5°F) from phase diagram consideration. Thus some melting with the composite pellets is found to occur at temperatures below −6.5°F, presumably because the $CaCl_2$ near the surface is preferentially leached out of the pellet. In other words higher ratios of $CaCl_2$ to NaCl than present in the whole pellet, initially dissolve from the surface — giving an initial benefit in cold weather operation well beyond the overall expected $CaCl_2$ contribution.

It is interesting in FIG. 1 that the lines for the pellets extrapolate at zero time to penetrations of about 0.1 inch while the NaCl lines extrapolate to close to the origin. This indicates that the initial rate of penetration of the pellet is very high — apparently due in part to the positive heat release involved in the hydration of the $CaCl_2$ component of the pellet. Using "International Critical Tables" it was calculated that the heat release on dissolution of these pellets would be sufficient for the pellet to penetrate to about one half its diameter. By contrast, rock salt absorbs heat on going into solution and no such effect would be expected.

In addition since the bulk density of the pellets is about two-thirds that of the rock salt, for a constant weight of chemical, the composite will contain about 50% more "pellet units" than the rock salt. In road deicing, the number of holes drilled through the ice to pavement is important in producing a clear surface and one would therefore expect that the loading (pounds per lane mile) required for clearance would be less with these pellets than with rock salt of comparable size. Preliminary road testng of this product shows this to be the case.

The composite pellets have a further advantage over an equivalent mechanical mixture of particles of $CaCl_2$ and of NaCl when used below the eutectic of NaCl, since the individual pieces of $CaCl_2$ and NaCl may land at points relatively distant from each other and at these temperatures only the melting capacity of the fewer $CaCl_2$ pieces would be realized.

Composite pellets of different fertilizer salts of different properties can be formed in the same fashion- and with control of particle size, surface layers, nuclei, binder liquid, void space and migration on drying etc. equivalent results obtained.

I claim:

1. Composite layered pellets of non-uniform cross-section each comprising a nucleus including a coarse particle of calcium chloride, surrounded by at least one layer of finer particles comprising sodium chloride, the particles being bonded together by salt bridges formed from a binder liquid solution of said salts on removal of the liquid, and migrated calcium chloride having formed increased calcium chloride content in the surrounding layer or layers, the calcium chloride being present in about 5–30% wt.

2. The pellets of claim 1 containing hydrates of $CaCl_2$ formed from aqueous binder liquid and $CaCl_2$ on standing at ambient temperature.

3. The pellets of claim 1 containing about 30–40% internal void space.

4. A method of forming non-uniform cross-section composite layered pellets containing calcium chloride and sodium chloride comprising:
   a. providing as pellet nuclei coarse particles of calcium chloride in amounts from about 5–30% wt.,
   b. contacting the nuclei particles with fine particles comprising sodium chloride,
   c. dispersing an aqueous binder liquid among the particles, the amount of binder liquid being of the order of 10–35% wt. based on dried pellet, the liquid being substantially saturated with sodium chloride and at least 40% saturated but not completely saturated with calcium chloride,
   d. balling the mixture with a tumbling action causing the fine particles to layer on the coarse calcium chloride,
   e. evaporating the aqueous liquid causing migration of some nuclei calcium chloride into surrounding layers and deposition of salt bonds, and
   f. recovering composite layered pellets having calcium chloride deposited among the sodium chloride.

5. The method of claim 4 wherein the fine particles are added in stages with successive layers being formed.

6. The method of claim 4, wherein the coarse salt is $CaCl_2$ flakes from the $CaCl_2$ recovery circuit of a Solvay process plant and the finer salt is NaCl byproduct from the same circuit.

7. The method of claim 4 wherein the binder liquid is a salt settler underflow from the $CaCl_2$ recovery circuit of a Solvay process plant.

8. The method of claim 4, wherein the binder liquid contains about 20 to about 45% by wt. $CaCl_2$.

9. The method of claim 4, wherein the following operation is carried out in a blanketing liquid which is immiscible with the binder liquid.

10. The method of claim 4 wherein the coarse calcium chloride is about 1–4 mm. diameter and the finer sodium chloride about 0.1–0.3 mm. diameter.

11. The method of claim 4 wherein the diameter of the coarse calcium chloride is of the order of 10 times that of the sodium chloride.

* * * * *